Patented Mar. 25, 1941

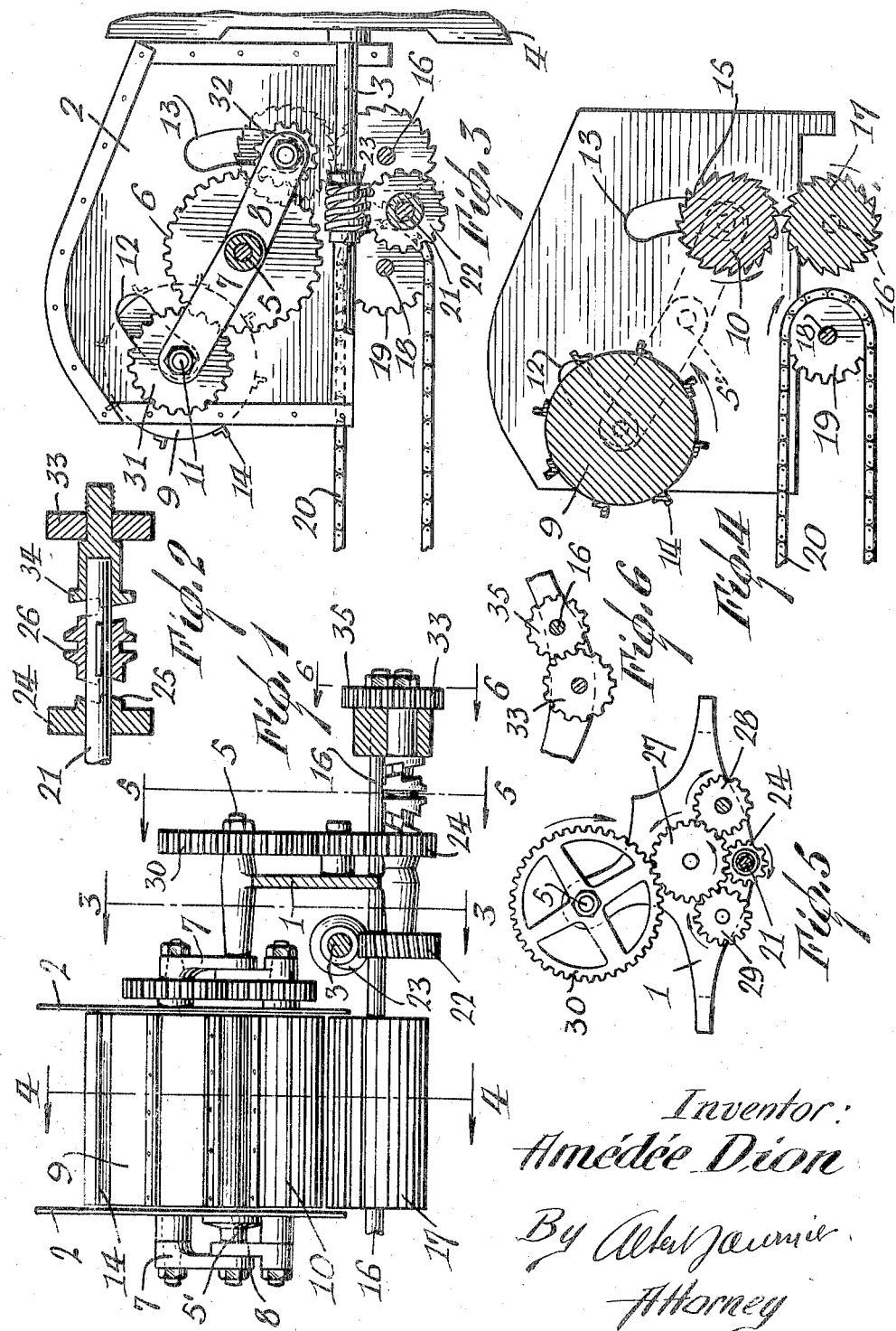

2,235,918

UNITED STATES PATENT OFFICE 2,235,918

FEED MECHANISM FOR AN ENSILAGE CUTTING MACHINE

Amedee Dion, Ste.-Therese de Blainville, Quebec, Canada

Application September 15, 1938, Serial No. 230,078
In Canada August 16, 1938

1 Claim. (Cl. 146—78)

The present invention pertains to a novel machine for cutting ensilage and similar material and is directed more particularly to the mechanism for feeding the material to the cutting wheel.

The latter may be of any desired construction but preferably as shown in my co-pending application Serial No. 230,079 filed September 15, 1938.

The machine includes a bin from which the material is fed to the cutting wheel. This mechanism includes a conveyor and a feed roller to propel the material towards the wheel. Between the roller and the wheel is a pair of preliminary cutting rollers which act on the material before it reaches the wheel.

One of the objects of the invention is to avoid damaging the machine in the event that there is an excessive accumulation of material at any of the rollers. To effect this purpose, the feed roller and the upper cutting roller are carried respectively on pivotally mounted supports, and these are so arranged, and the bin so constructed, as to permit an upward movement of the supports with their rollers when excessive accumulation occurs. Thus, the pressure is removed from the material and damage to the machine is avoided.

Another object of the invention is to enable reversing the mechanism, as may be desirable when there is excessive accumulation or when the machine is to be cleaned. In keeping with this object, the several rollers and the conveyor are driven by the same gear train. In this train is included a clutch shaft carrying a pair of pinions or gears, either of which may selectively be introduced into the gear train. The clutch shaft carries a splined clutch member adapted to be brought into engagement with either of the otherwise loose and opposite gears. Thus, the direction of the gear train is reversed by shifting the clutch member from one of these gears to the other.

The invention is fully disclosed by way of example in the following description and in the accompanying drawing in which:

Figure 1 is an end view of the device, partly in section, at the discharge end;

Figure 2 is a detail longitudinal section of the clutch;

Figure 3 is a section on the line 3—3 of Figure 1;

Figure 4 is a section on the line 4—4 of Figure 1;

Figure 5 is a section on the line 5—5 of Figure 1, and

Figure 6 is a section on the line 6—6 of Figure 1.

Reference to these views will now be made by use of like characters which are employed to designate corresponding parts throughout.

The frame structure of the apparatus is designated generally by the numeral 1 and includes a pair of vertical side plates 2 constituting a bin for the material before reaching the cutting mechanism. At one side of the bin and externally thereof is journalled the main or drive shaft 3 which receives the power and carries the cutting wheel 4 at the discharge end of the bin. The cutting wheel may be of any known construction or, preferably, such as that disclosed in my co-pending application Serial No. 230,079 filed September 15, 1938.

Through the frame 1 is journalled a shaft 5 carrying a gear 6 as clearly shown in Figure 3. Pairs of links 7 and 8 extend in opposite directions from the shaft 5 and a stub shaft 5' and having journalled between them rollers 9 and 10 respectively, as shown in Figure 4. The bolts 11 securing the rollers to their respective links are received and guided in arcuate 12 and 13 in the plates 2, for a purpose that will presently be described. The roller 9 carries transverse and parallel angle irons or bars 14 on its surface. The preliminary cutting roller 10 is at a lower level and is formed along its length with teeth 15.

Beneath the axis of the roller 10 is journalled a shaft 16 carrying a similar preliminary cutting roller 17 cooperating with the roller 10 to move the material towards the wheel 4. In advance of the shaft 16 is journalled a parallel shaft 18 carrying a sprocket wheel 19. A conveyor comprising a sprocket chain 20 is trained over the wheel 19 and is adapted to deliver the material beneath the roller 9. The latter throws the material against and between the rollers 15 and 17, from which the material is passed to the cutting wheel 4. If the accumulation at any of the rollers becomes excessive, the affected roller merely rises in its slot 12 or 13, whereby breakage of the parts is prevented.

Beneath and perpendicular to the shaft 3 and between the shafts 16 and 18 is another shaft 21 carrying a gear 22. The power shaft 3 carries a worm 23 meshing with the gear 22. The shaft 21 also carries a loose pinion 24 (Figure 2) with a clutch element 25 adapted to be engaged by a double clutch member 26 splined on the shaft 21, as shown in Figure 2. A gear 27 journalled above the pinion 24 meshes with the latter and also with pinions 28 and 29 on the shafts 16 and 18 respectively. The gear 27 also meshes with a gear 30 on the shaft 5, and the gear on shaft 5 meshes with gears 31 and 32 secured to the rollers 9 and 10 respectively.

Thus, with the clutch 25, 26 engaged, the drive is from power shaft 3 through worm 23, gear 22, pinion 24, gear 27 to gears 28 and 29 for operating the roller 17 and conveyor 20, and from gear 27 also to gear 30, shaft 5 gears 6, 31, 32 for operating rollers 9 and 10. The latter turn in the same direction and opposite to roller 17 and conveyor 20, as indicated by the arrows in Figures 4 and 5.

The shaft 21 carries another loose pinion 33 with a clutch element 34 engageable by one end of the clutch member 26 in moving the latter away from the pinion 24. The pinion 33 meshes with another pinion 35 on the shaft 16, as shown in Figure 6.

As previously stated, the shifting clutch member 26 normally engages the pinion 24 for forward drive. In order to reverse the machine, as when it becomes clogged or for cleaning or for any other reason, the clutch member 26 is shifted to the element 34 to turn the pinion 33. The latter transmits motion to the shaft 16 and gear train connected thereto, as previously described, but in the reverse direction.

Although a specific embodiment of the invention has been illustrated and described, it will be understood that various alterations in the details of construction may be made without departing from the scope of the invention, as indicated by the appended claim.

What I claim is:

In a cutting machine of the character described, a bin, a cutting wheel at the outlet thereof, a pair of independently pivotally mounted supports in said bin and movable in vertical planes, a feed roller carried by one of said supports, a preliminary cutting roller carried by the other support between the first roller and wheel, said rollers being raised and lowered in arcuate paths by said supports, a complementary cutting roller adjacent to the said preliminary cutting roller, a bolt passed through the axis of each roller for maintaining the latter on its respective support, the adjacent walls of said bin having arcuate slots receiving and guiding the ends of said bolts, said ends being adapted to rest on the lower ends of said slots, and means for driving said rollers in a direction to advance material to be cut towards said wheel.

AMEDEE DION.